United States Patent [19]

Kienel

[11] 3,971,686

[45] July 27, 1976

[54] LABEL APPLYING METHOD

[76] Inventor: Joseph Edward Kienel, Drawer K, Acworth, Ga. 30101

[22] Filed: Mar. 27, 1975

[21] Appl. No.: 562,639

Related U.S. Application Data

[62] Division of Ser. No. 258,818, June 1, 1972, Pat. No. 3,886,026.

[52] U.S. Cl. .................................. 156/212; 156/285

[51] Int. Cl.$^2$ .......................................... B29C 17/04

[58] Field of Search .................... 156/361, 540–542, 156/477 R, 468, 481–482, 486, 492, 443, 556, 566, 212, 226–227, 285, DIG. 3; 53/218, 198 R; 93/40

[56] References Cited

UNITED STATES PATENTS

| | | | |
|---|---|---|---|
| 2,704,168 | 3/1955 | Nord et al. | 156/581 X |
| 2,831,303 | 4/1958 | Hollis | 53/218 X |
| 2,958,267 | 11/1960 | Wolff et al. | 93/40 X |
| 3,562,067 | 2/1971 | Kucheck | 156/542 |
| 3,629,991 | 12/1971 | Sundin | 53/198 R X |
| 3,832,829 | 9/1974 | Stout | 53/218 X |

*Primary Examiner*—David A. Simmons
*Attorney, Agent, or Firm*—Bell, Seltzer, Park & Gibson

[57] ABSTRACT

A method for successively applying an elongated label having an adhesive on one surface, to articles of merchandise. The method includes the steps of sequentially separating the labels from a carrier web, and individually delivering the separated labels to a labeling station. Upon a label reaching the labeling station, the feed of the label is automatically terminated, and the leading and trailing ends of the label are then folded about an article which has been placed over the medial portion of the label by the operator. Upon removal of the article with the attached label, another individual label is delivered to the labeling station.

7 Claims, 8 Drawing Figures

LABEL APPLYING METHOD

This application is a division of Ser. No. 258,818 filed June 1, 1972 now U.S. Pat. No. 3,886,026.

The present invention relates to a method for applying a label to articles of merchandise, such as pairs of men's socks. More particularly, the invention relates to a method for separating serially arranged labels releasably adhered to a carrier web of indeterminate length, and for successively applying the separated labels to articles intermittently presented thereto.

In the packaging of various types of merchandise, such as men's socks and the like, it is known to attach a printed label by wrapping the ends thereof about the article so as to totally surround it. In such cases, the label not only serves to identify the article, but it may also serve as a means for individually packaging the pairs of socks.

It is common to apply labels of the above type to articles of merchandise by a manual operation, wherein a label having printed indicia on one surface and an adhesive on the other surface is manually selected and then applied by wrapping the same about the article while the article is held by the worker. As will be apparent, such hand operations are tedious and time-consuming, and significantly increase the production costs for the article.

While label applying machines have been proposed for applying an adhesively coated label to one surface of a relatively flat article of merchandise such as packaged foodstuffs, to applicant's knowledge no machine has been developed which is capable of wrapping an elongated label completely about an article of irregular shape such as men's socks.

Other machines have been proposed for wrapping a piece of tape about a relatively rigid article such as an automobile tail pipe which is inserted into the machine. In such machines as are known to applicant, a length of tape is pulled from a delivery spool across a wrapping station by a pair of jaws. The tape is then mechanically severed, and the tape is contacted by the article to be wrapped and carried downwardly with the article while the article is lowered into the machine so that the tape is wrapped about the lower and side edges of the article. Such machines are not fully satisfactory, however, since there is no assurance that the jaws will properly grip the tape end to pull it to the wrapping station, and if the jaws should fail in this function, the machine must be manually recycled or the tape pulled by hand. Also, such machines can be employed only where relatively sturdy articles, such as automotive tail pipes, are to be labeled, and could not be employed where relatively flimsy articles, such as men's socks, are to be labeled.

It is accordingly an object of the present invention to provide a method for automatically applying a label to an article of merchandise by wrapping the ends of the label about the article when the article is placed upon the label.

It is another object of the present invention to provide a method of the described type which includes sequentially separating labels which are releasably adhered to a carrier web, and individually delivering the separated labels to a labeling station with the adhesive surface facing upwardly.

It is a further object of this invention to provide a label feeding means which will continue to operate until a label reaches its proper position, and which is responsive to a label reaching this position to then terminate the operation of the feeding means.

Still another object of the present invention is to provide a method of the described type which is adapted to apply the labels to articles which are intermittently presented, in either regular or non-regular intervals.

It is a more specific object of the present invention to provide a method of the described type wherein the separating and delivering of the labels is terminated upon an individual label reaching the labeling station, and the separating and delivering of the labels is commenced to deliver another individual label upon removal of the article and applied label from the labeling station.

These and other objects and advantages of the present invention are achieved in the embodiment of the invention herein disclosed by the provision of a label applying method which comprises the steps of sequentially separating the labels from the carrier web and delivering the same to the labeling station, terminating the separating and delivering means upon a label reaching the labeling station, and folding the leading and trailing ends of the label about the article when the article is positioned to transversely overlie the medial portion of the label. Subsequently, the separating and delivering steps are reactuated when the article and applied label are removed from the labeling station. Also, the delivery of the separated labels to the labeling station includes holding each label in contact with an endless belt by means of suction.

Some of the objects and advantages of the invention having been stated, others will appear as the description proceeds, when taken in connection with the accompanying drawings, in which.

Figures 1, 2:
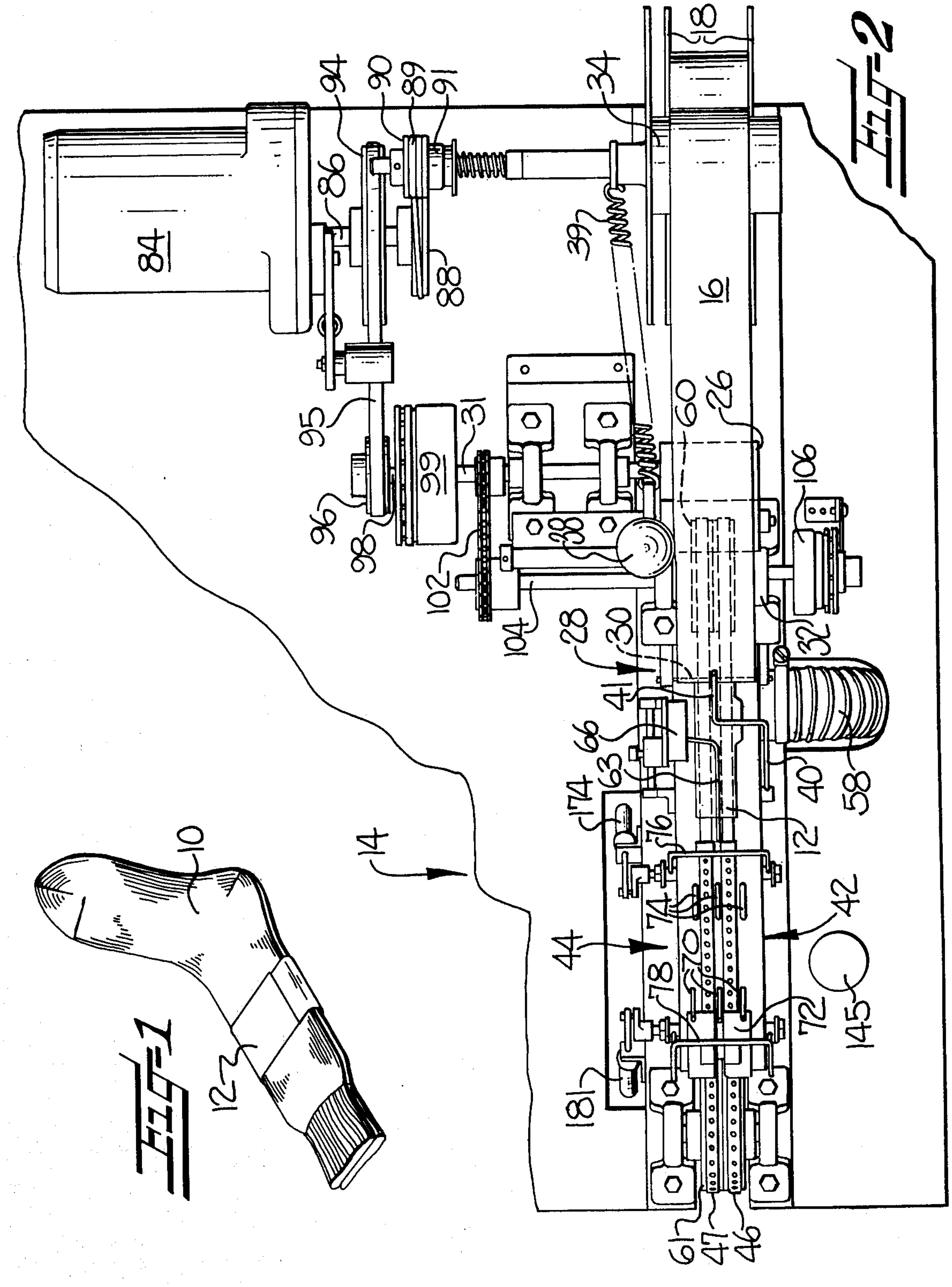
FIG. 1 is a perspective view of a pair of men's socks having a label applied thereto according to the present invention.
FIG. 2 is a fragmentary plan view of an apparatus adapted to carry out the method of the present invention.

Referring more specifically to the drawings, FIG. 1 discloses an article of merchandise, and more particularly a pair of men's socks 10 having a label 12 wrapped thereabout in the manner of the present invention.

Figure 3:
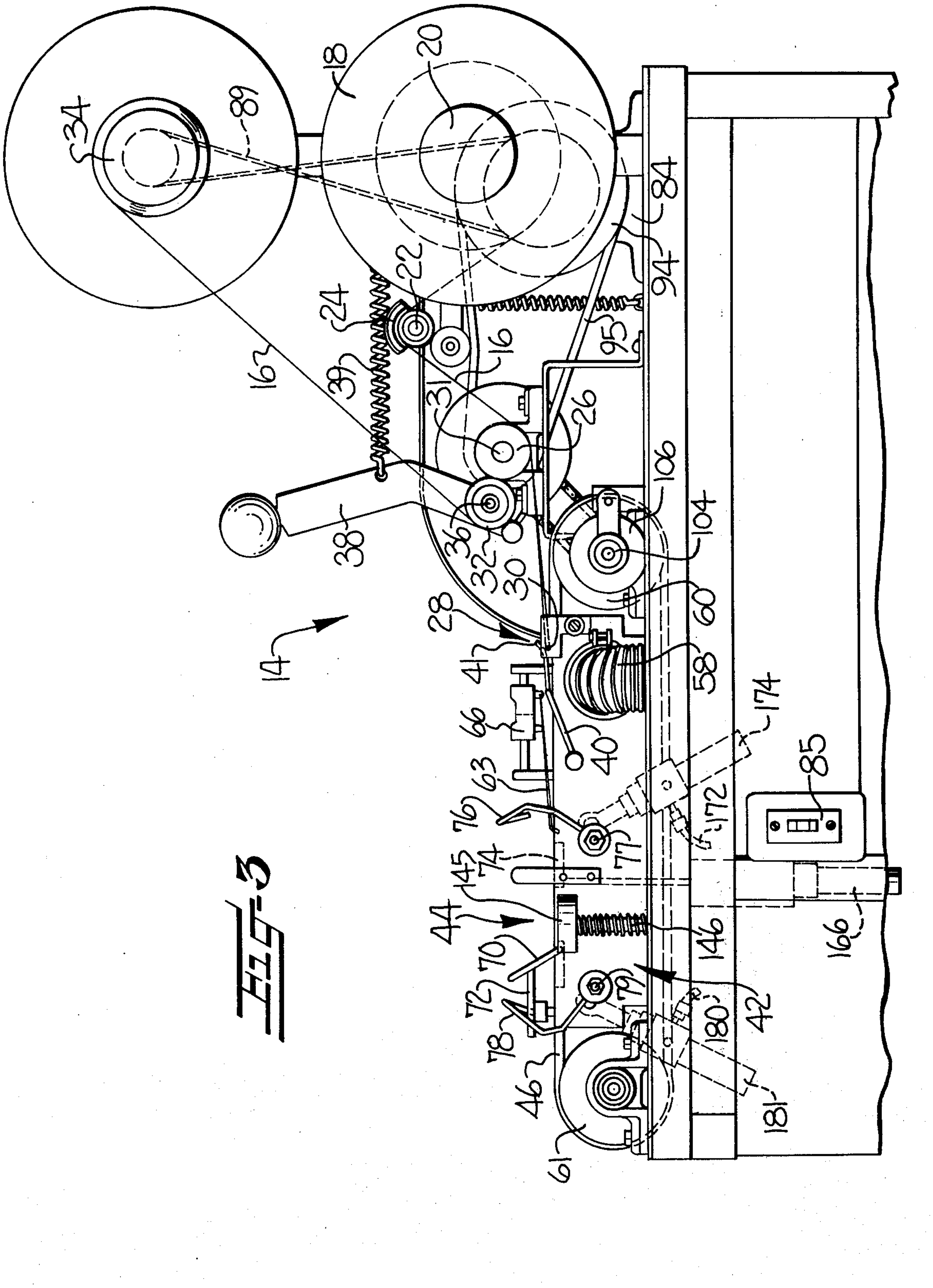
FIG. 3 is a side elevational view of the apparatus shown in FIG. 2.

An apparatus for automatically applying the label 12 according to the present invention is illustrated generally at 14 in FIGS. 2 and 3. The apparatus 14 includes a supply system for a carrier web 16, the web 16 having a plurality of serially arranged labels 12 releasably adhered thereto by a suitable pressure sensitive adhesive or the like in the conventional manner. A roll of the web 16 is carried by a delivery spool 18 which is adapted to freely rotate about the axis of the supporting rod 20. The web 16, with the labels 12 facing downwardly, is drawn from the spool 18 and initially threaded between a guide roll 22 and mating felt pad 24, and then directed beneath the drive roll 26.

The means for sequentially separating the labels from the carrier web 16 is generally indicated at 28 and includes a corner member in the form of a small diameter rod 30 positioned transversely of the carrier web such that the web may be drawn through 180° around the rod 30 to peel the labels 12 from the web 16. The web is then directed in the reverse direction beneath the drive roll 26 so as to be positioned between the roll 26 and the web coming in the opposite direction from the spool 18. The roll 26 is rotatably carried with shaft 31 and is driven in the manner hereinafter further described. The roll 26 may include a knurled surface (not shown) to securely grip the carrier web. The web passes from the drive roll 26 about a cooperating follower roll 32 and to the take up spool 34. The roll 32 is mounted for free rotation about a spindle 36 which is in turn connected to the lever arm 38. The lever arm is biased in the rearward direction by the spring 39 as seen in FIG. 3 to resiliently press the roll 32 against the drive roll 26 to thereby provide a firm frictional interengagement between the drive roll 26 and carrier web 16.

Figure 4:
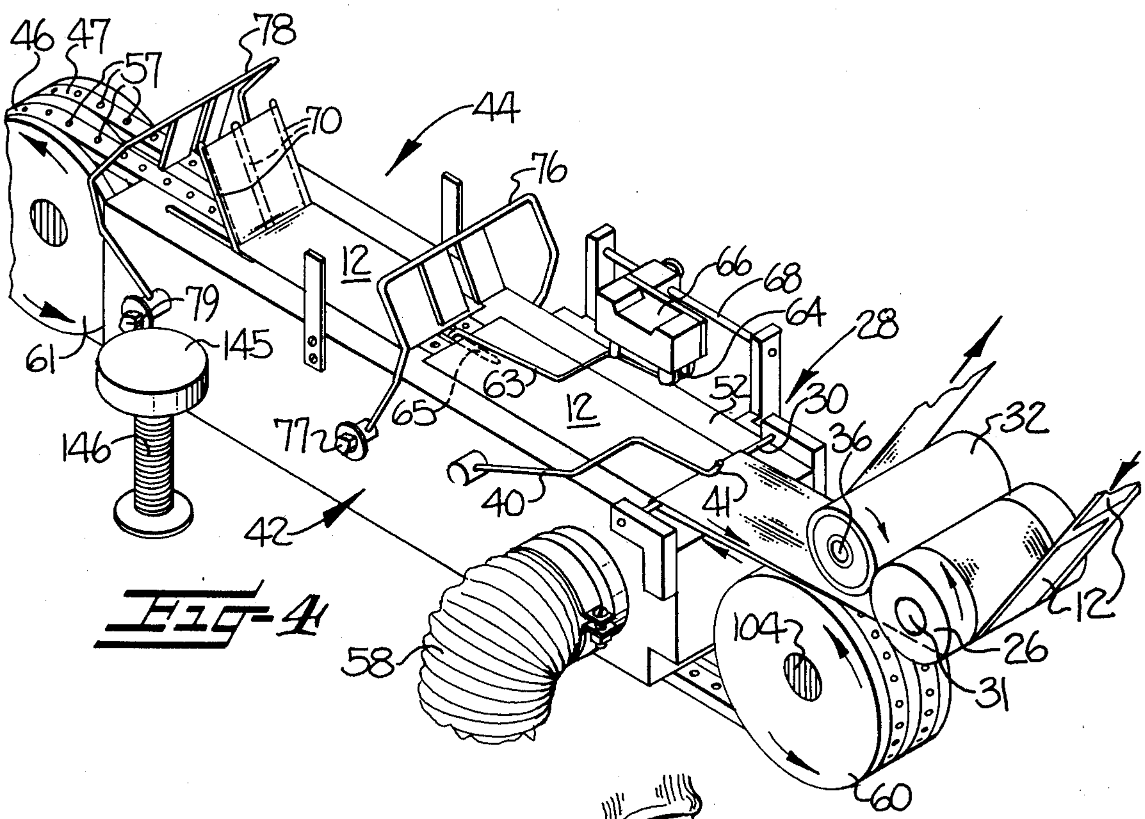
FIG. 4 is a fragmentary perspective view of the label separating and delivering means, and labeling station of the present invention, and illustrating the same in position to receive an article to be labeled.

The label separating means 28 further includes a label stripping member 40 which insures that the label on the web 16 will be removed therefrom upon passing around the corner member 30. The stripping member 40 is in the form of elongated wand, and is pivotally connected along one side of the vacuum box 42 as seen in FIG. 4. The wand is configured such that its outer extremity 41 rests upon the corner member 30 and extends outwardly therefrom such that a label 12 passing around the corner member on the web 16 engages the wand extremity 41 and is directed horizontally outwardly from the web.

From the label separating means 28, the separated labels 12 are delivered with the adhesive surface of the label facing upwardly, along a horizontal path of travel to a labeling station generally indicated at 44. The means for delivering the labels in this manner includes a pair of endless belts 46 and 47 which are disposed in parallel side by side relationship and which together define an upper horizontal surface which extends generally from the corner member 30 and across the labeling station 44. The belts are selectively rotated in unison to feed a label from the corner member to the labeling station by a drive arrangement hereinafter further described.

To maintain the labels on the belts during their movement between the corner member and labeling station, there is provided vacuum means for drawing each label into firm engagement with the upper surfaces of the belts. This vacuum means includes the vacuum box 42 which defines a central enclosure 50, an upper surface 52, and a pair of longitudinal slots 54 and 55 extending through the upper surface of the box along the full longitudinal length thereof and communicating with the enclosure 50. The box further includes a side wall opening 56. The slots 54 and 55 are adapted to closely receive the upper segments of the belts 46 and 47, respectively, such that the upper surface defined by the belts is substantially coextensive with the upper surface 52 of the box. The belts 46 and 47 further include a plurality of closely spaced vertical openings 57 extending through the belt. Means including a conventional vacuum pump (not shown) and hose 58 are provided for drawing a partial vacuum in the enclosure 50 through the side wall opening 56 such that a suction is developed through the belt openings 57 to secure a label thereto.

Figure 8:
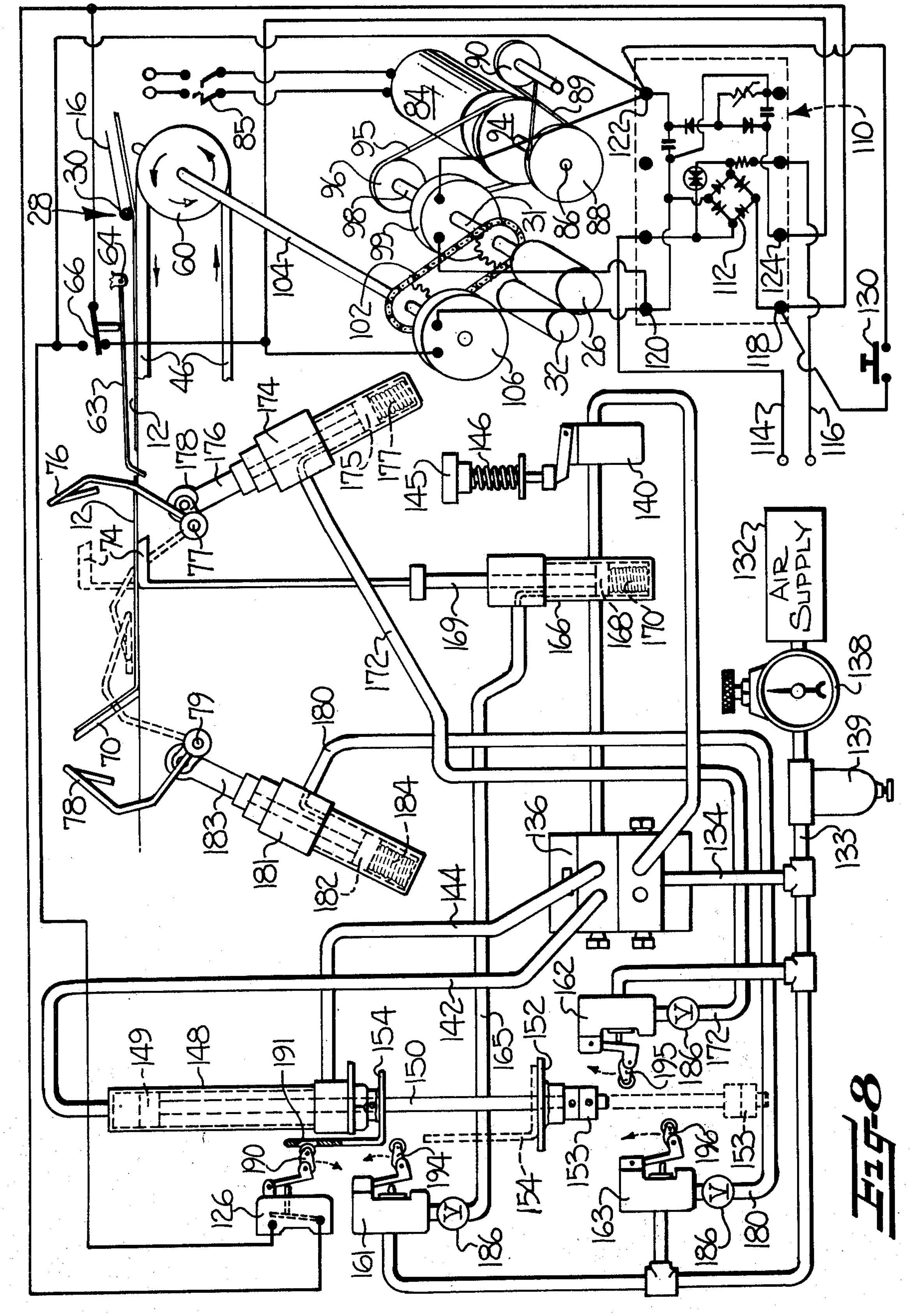
FIG. 8 is a schematic diagram illustrating the electrical drive means for the apparatus, as well as the pneumatic pressure system for folding the ends of the label about the article.

As will be more fully described below, the belts 46 and 47 are entrained about the pulleys 60 and 61, the pulley 60 being sequentially rotated to feed the labels along the path of travel from the corner member 30 to the labeling station 44 as defined by the upper surface of the belts. To terminate operation of this feeding means upon a label reaching the labeling station, there is provided a label sensing follower 63 positioned along the path of travel and which is designed to sense a label delivered to the labeling station 44. As best seen in FIGS. 4 and 8, the follower 63 is pivotally connected at 64 such that the free end thereof rests upon an indentation 65 in the upper surface of the vacuum box 42 between the two belts. Also, the follower 63 is operatively connected to an electrical switch 66. Thus, as a label is passed beneath the follower 63, the follower is lifted to cause switch 66 to assume its raised position wherein the rotation of the drive belts may be continued. When the follower 63 drops from the trailing end of the label as seen in FIGS. 4 and 8, the switch 66 assumes its lowered position (as shown in FIG. 8) wherein the operation of the drive belt is terminated. By this arrangement, the label feeding means will continue operation until a label is properly delivered to the labeling station at which point the operation of the feeding means is terminated. As seen in FIG. 4, the switch 66 is mounted for selective longitudinal movement along the mounting rod 68 which in turn is carried by the box 42. Thus, the point at which the feeding means may be terminated may be accurately controlled to permit adjustment for labels of varying length.

To sequentially apply the labels delivered to the labeling station 44 to articles of merchandise placed thereupon, there is provided means for sequentially lifting and folding the leading and trailing ends of the label about the article to adhere the ends of the label in overlapping relation thereabout. More particularly, there is provided an inclined cam surface 70 at the leading end of the labeling station 44, the cam surface 70 being positioned to communicate with the path of travel defined by the belts 46 and 47 such that the leading end of a label is lifted upwardly from the path of travel upon reaching the assembly station. The cam surface 70 is in the form of three upwardly inclined guide rods, the rods being attached to a horizontal member 72 as seen in FIG. 3. The member 72 in turn is adjustably connected to the box 42 so as to permit longitudinal movement of the cam surface 70 along the upper surface of the box and thus accommodation of labels of varying length.

Figure 6:
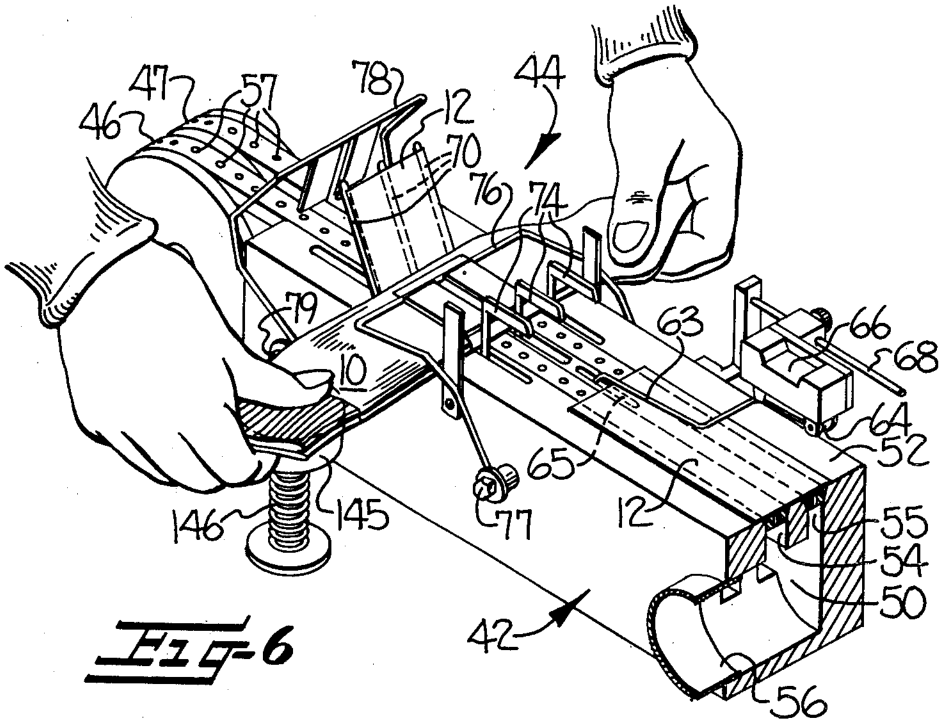
FIG. 6 is a view similar to FIG. 5 and showing a subsequent step in the label applying method.
Figure 7:
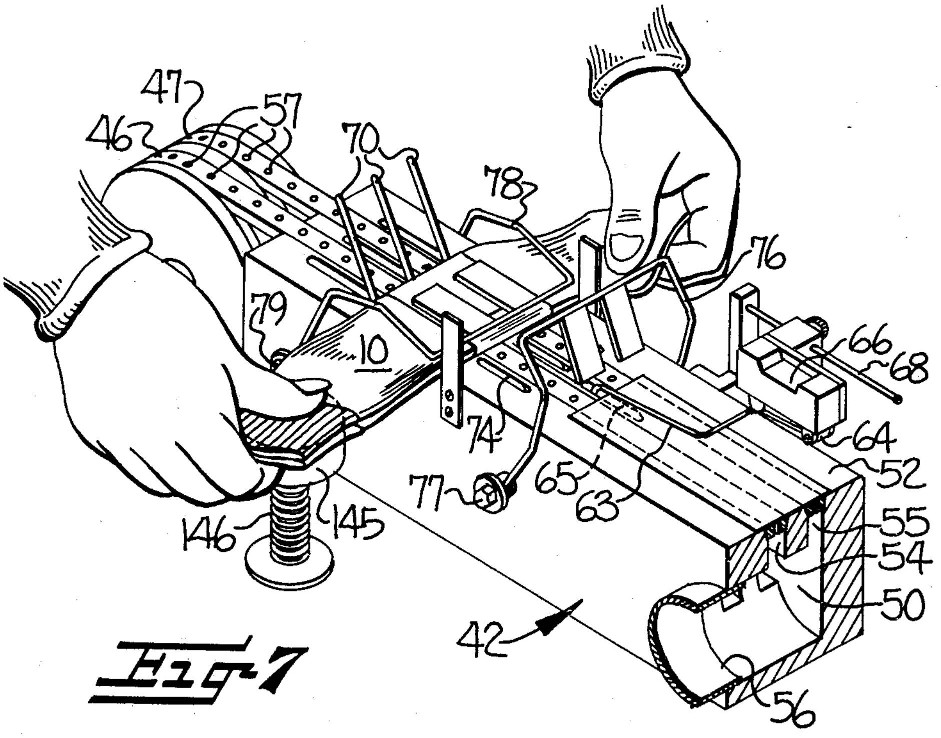
FIG. 7 is a view similar to FIGS. 5 and 6 and showing the next subsequent step in the label applying method.

The means for sequentially lifting and folding the ends of the label further includes a vertically movable lift arm 74 positioned immediately below the trailing end of the labeling station, a first longitudinally movable arm 76 pivotally connected to the vacuum box 42 at 77, and a second longitudinally movable arm 78 pivotally connected to the vacuum box at 79. The arms 74, 76 and 78 are actuated in sequence by a pneumatic control means hereinafter further described, such that the lift arm 74 is initially moved upwardly to at least partially lift the trailing end of the label (note FIG. 5), the first arm 76 is then moved toward and then away from the second arm 78 to fold the trailing end of the label over an article (note FIG. 6), and the second arm 78 is then moved toward and then away from the first arm 76 to fold the leading end of the label over the article (note FIG. 7). As will be understood, the adhesive on the upper surface of the label will secure the same to the article 10 such that the article may be withdrawn from the assembly station with label applied thereto.

The drive means for the above described label separating means and feeding means includes an electrical drive arrangement as illustrated schematically in FIG. 8. In the illustrated embodiment, the drive means includes an electrical motor 84 controlled by the master on-off switch 85. The motor 84 has an output shaft 86 mounting a first pulley 88 operatively connected via the drive belt 89, pulley 90, and slip clutch 91 to the take-up spool 34. By design, the slip clutch 91 maintains a constant pressure on the web 16 such that the take-up spool 34 rotates during actuation of the feeding means as further described below.

A second drive pulley 94 is operatively connected to the output shaft 86, the second pulley 94 being connected by the belt 95 and pulley 96 to a second shaft 98. The shaft 98 is connected across the electro-magnetic clutch 99 to the shaft 31 which mounts the drive roll 26 for rotation therewith. Thus, when the clutch 99 is engaged, the shaft 31 and drive roll 26 are rotated to feed the web 16 from the delivery spool 18 to the take-up spool 34.

The shaft 31 is further operatively connected by the chain drive 102 to a third shaft 104. The shaft 104 mounts the forward drive pulley 60 for the belts 46 and 47 at one end thereof, and an electro-magnetic brake 106 at the opposite end. For the reason to become apparent, the brake is designed to quickly terminate rotation of the shafts 31 and 104 when the brake is engaged and the clutch is disengaged, but the shafts 31 and 104 will rotate if the clutch 99 is engaged even though the brake 106 is engaged.

The electrical circuit for controlling the above described drive means is also illustrated schematically in FIG. 8, and includes a conventional power supply circuit 110. Briefly described, the supply circuit 110 includes a bridge rectifier 112 which converts the alternating current from the lines 114 and 116 to a direct current with the power line connected to terminal 118 and the ground line connected to terminal 120. The electro-magnetic clutch 99 is connected between the power terminal 118 and intermediate terminal 122, and the electro-magnetic brake 106 is connected between the power terminal 120 and the intermediate terminal 124.

Three mechanically operated switches are positioned in the circuit to selectively actuate the clutch 99 and brake 106 to control the sequence of operations in a manner to become apparent. More specifically, there is provided a first switch 126 for interconnecting the clutch 99 across the terminals 118 and 120 to thereby engage the clutch, a second switch 66 having a first position (as illustrated in FIG. 8) for interconnecting the brake 106 across the terminals 118 and 120 to engage the brake, and a second raised position interconnecting the clutch across terminals 118 and 120 to engage the clutch. A third manually operated switch or jog button 130 is provided for interconnecting the clutch across the terminals 118 and 120 for engaging the clutch.

The control means for sequentially actuating the arms 74, 76, and 78 includes the pneumatic pressure system schematically illustrated in FIG. 8. The pressure system includes a conventional air supply source 132 for delivering pressurized air through lines 133 and 134 to the pilot valve 136. As illustrated, a conventional pressure meter 138 and air filter 139 are positioned in the line 133 adjacent the air supply 132. The valve 136 is of conventional design and is operatively controlled by a manually operable master air switch 140 having a first (lowered) position wherein air is directed from line 134 to line 142, and a second (raised) position wherein pressurized air is directed from line 134 to line 144. The switch 140 is operatively controlled by the plunger 145 which is biased upwardly by the spring 146 so that the switch 140 normally assumes its raised position.

The air lines 142 and 144 are connected to the upper and lower ends of an air cylinder 148, respectively, the cylinder including a translatable piston 149 operativey connected to a control rod 150 which extends from the lower end of the cylinder. The lower end of the rod 150 extends through a fixed guide plate 152 and mounts an abutment member 153 therebelow. An L-shaped arm 154 is connected to an intermediate portion of the rod 150. As will be apparent, movement of the air switch 140 from its raised to its lowered position will cause air to pass through line 142 to lower the piston 149 and control rod 150 to the position shown in dashed lines in FIG. 8. Upon release of the switch 140, air will be redirected into line 144 to raise the piston and rod to their original positions.

The air line 133 is also connected in parallel with three air valves 161, 162, and 163. Each of these valves is illustrated in the "open" position such that air from the line 133 is adapted to pass therethrough to an associated air cylinder. More particularly, the valve 161 is connected through line 165 to air cylinder 166, the cylinder 166 including a vertically translatable piston 168 and connecting rod 169, the rod 169 being coaxially connected to lift arm 74. A spring 170 is positioned beneath the piston to urge the piston and rod upwardly. However, when the line 165 is connected to the air supply 132 through valve 161 and line 133, the piston 168 will assume a lowered position as shown in FIG. 8. When the air valve 161 is actuated, the pressure in line 165 is released to the atmosphere to permit the spring 170 to raise the rod 169 and the lift arm 74.

The air valve 162 is connected through line 172 to the air cylinder 174 which includes the piston 175, connecting rod 176 and spring 177 as described above. In this case, however, the connecting rod 176 is connected via the lever arm 178 to the arm 76 such that upward movement of the connecting rod 176 causes a pivoting movement of the arm 76 about the connection at 77. Likewise, the air valve 163 is connected via the line 180 to the air cylinder 181 which includes the piston 182, connecting rod 183, and spring 184. Thus, when the rod 183 moves upwardly upon release of the pressure in line 180, the arm 78 will be pivoted about the connection 79. The lines 165, 172, and 180 may further include a manually controlled relief valve 186 to permit the operator to release the pressure in these lines when the apparatus is not in use.

As seen in FIG. 8, the electrical switch 126 and the air valves 161, 162, and 163 are mounted in predetermined position along the path of travel of the control rod 150 of the air cylinder 148. In addition, the switch and three valves are each controlled by a pivotal lever arm which is actuated during movement of the control rod 150 in one direction, but which is not actuated during movement of the rod in the opposite direction. More specifically, the switch 126 includes a pivot arm 190 which is adapted to be retained in a somewhat horizontal position by a slot 191 in the L-shaped arm 154, and which is free to rotate downwardly as shown in dashed lines without actuating the switch 126. However, when the rod 150 is being raised, the upper edge of the arm 154 contacts and rotates the pivot arm 190 upwardly which causes the switch 126 to close.

In the case of the air valves 161, 162, and 163 there is provided a pivot arm 194, 195, and 196, respectively, each of which is adapted to freely pivot upwardly as shown in dashed lines without actuating the associated valve. However, downward movement of these pivot arms actuates the associated valve. Thus, upon downward movement of the control rod 150, the switch 126 remains open, and the valve 161 is initially actuated to exhaust the line 165. The line 165 is held open during the traverse of the L-shaped arm 154 past the valve 161 such that the lift arm 74 will be raised and held in the raised position for a short period of time. After the arm 154 passes the valve 161 and reaches the dashed line position shown in FIG. 8, pressure will be reestablished in line 165 to cause the lift arm 174 to be lowered to its original position.

Also, upon downward movement of the control rod 150, the abutment member 153 will initially contact the pivot arm 195 of the valve 162 to exhaust line 172 to the atmosphere. This line remains exhausted for a relatively short period of time, and pressure will be reestablished upon passage of the abutment member 153. Shortly, thereafter, the abutment member 153 will contact the pivotal arm 196 of the valve 163 to exhaust line 180. This line will remain exhausted for a similarly short period of time.

When the control rod 150 commences its upward movement from the position shown in dashed lines in FIG. 8, it will be observed that the rod will cause the pivot arms 196, 195, and 194 to be sequentially lifted, but such action does not actuate the respective air valves. However, when the arm 154 engages the pivot arm 190 of the electrical switch 126, the switch is closed to connect the clutch 99 across the terminals 118 and 120.

To describe the operation of the apparatus 14, it first necessary to place a roll of the carrier web 16 on the delivery spool 18 and then thread the web through the apparatus in the manner described above to the take-up spool 134. To commence the automatic operation of the machine, the operator initially closes the master on-off switch 85 which actuates the electrical motor 84. This in turn causes the slip clutch 91 to tension the web 16. Also, since at this point the clutch 99 is not engaged and brake 106 is engaged by reason of switch 66 being in its lowered position, there will be no rotation of the drive roll 26 and belts 46 and 47. To commence the label separating and feeding operations, the operator manually closes the jog button 130 to engage the clutch and thereby rotate the drive roll 26 and belts 47 and 47. At this point, it will be observed that the brake 106 remains engaged by reason of the fact that the switch 66 is in its initial lowered position. However, as noted above, the clutch will override the brake to cause rotation of these members.

As the first label 12 is removed from the carrier web 16, it passes from right to left as seen in FIGS. 4–7 along a path of travel defined by upper surface of the belts 46 and 47. The label will cause the label sensing follower 63 to be lifted so as to lift switch 66 to its raised position. Thus, the brake will be disengaged and a holding circuit will be established to keep the clutch engaged, even though the operator releases the jog button 130. As the label continues along the path of travel and reaches the labeling station 44, the label sensing follower 63 will drop from the trailing end of the label to cause the switch 66 to assume its lowered position to thereby engage the brake and disengage the clutch. This causes rotation of the drive belts 46, 47 and drive rollers 26 to quickly terminate. At this point, the apparatus is in the configuration shown in FIG. 4 with a label positioned at the labeling station 44, the label having its leading end raised by the cam surface 70.

Figure 5:
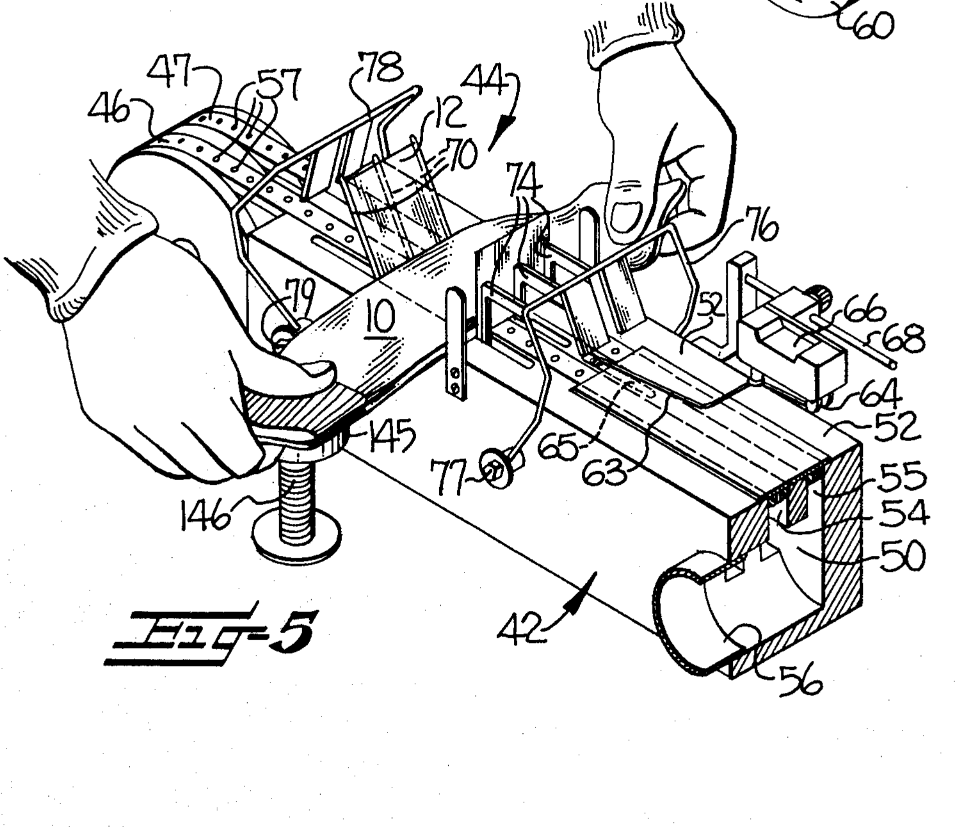
FIG. 5 is a view similar to FIG. 4, but partly sectioned, and showing the initial step in the label applying method.

The apparatus is now ready to receive an article of merchandise such as the pair of men's socks 10 shown in FIG. 5, the article being manually positioned to transversely overlie the medial portion of the label. Also, it will be noted that the plunger 145 for the air switch 140 is conveniently located adjacent the assembly station such that it may be depressed by the operator while holding the article across the label. Upon depressing the plunger 145 and switch 140, the piston 149 in the air cylinder 148 is depressed to sequentially actuate the lift arm 74, and longitudinally movable arms 76 and 78. Specifically, the lift arm 74 is initially lifted to raise the trailing end of the label in the manner shown in FIG. 5. The lift arm 74 is momentarily retained in this position while the first arm 76 is pivoted longitudinally forward to pick up the lifted trailing end of the label and carry the same over and onto the upper surface of the socks 10. The first arm then retracts, and the second arm 78 similarly engages the lifted leading end of the label to carry the same over the article and onto the previously folded trailing end of the label. The second arm then retracts to permit the article and applied label to be removed from the assembly station.

Upon removal of the article and applied label, the plunger 145 is released to cause the air switch 140 to lift to its raised position. This in turn causes the piston 149 of air cylinder 148 to be raised, and during the last portion of this raising operation, the electrical switch 126 is closed to again engage the clutch 99. Thus, the drive roll 26 and belts 46, 47 are again rotated until another label reaches the assembly station.

From the above, it will be apparent that the described apparatus is automatic in that once the machine is in operation, the operator need perform no function other than delivering an article to be labeled to the labeling station, holding the same at the labeling station in a relatively fixed position during the folding operation, and then removing the article and applied label. During this procedure, the apparatus will automatically lift and fold the leading and trailing ends of the label about the article, and upon removal thereof, will actuate the label separating and feeding means to cause another label to be delivered to the labeling station.

In the drawings and specification, there has been set forth a preferred embodiment of the invention, and although specific terms are employed, they are used in a generic and descriptive sense only and not for purposes of limitation.

That which is claimed is:

1. A method for applying a label to an article of merchandise such as men's socks or the like, comprising the steps of:

placing a label upon an endless belt which extends along a path of travel and across a labeling station, moving the label along the path of travel and to the labeling station by rotating the endless belt and while drawing a partial vacuum below the upper surface of the belt to draw the label into firm engagement with the belt, holding the label at the labeling station upon its reaching the same by terminating rotation of the endless belt and by maintaining the partial vacuum below the upper surface of the belt, positioning the article of merchandise transversely across and upon the medial portion of the label while the label is being held at the labeling station, and then lifting and folding the ends of the label about the article of merchandise while maintaining the article in a relatively fixed position at the labeling station such that the label substantially encircles the article.

2. The method as defined in claim 1 comprising the further steps of partially lifting the leading end of the label while the label is being moved along the path of travel and maintaining such end lifted upon the label reaching the labeling station.

3. The method as defined in claim 1 wherein the step of lifting and folding the ends of the label includes sequentially lifting and folding the ends of the label so that they are adapted to be positioned in overlapping relation about the article.

4. The method as defined in claim 1 wherein the step of drawing a partial vacuum below the upper surface of the belt includes drawing a partial vacuum through openings in the belt such that a suction is developed through the belt openings to secure the label thereupon.

5. A method for applying a label having an adhesive on one surface and which is releasably adhered to a carrier web, to an article of merchandise such as men's socks or the like, comprising the steps of:

separating the label from the carrier web, placing the separated label upon an endless belt which extends along a path of travel and across a labeling station and with the adhesive surface facing away from the belt, moving the label along the path of travel and to the labeling station by rotating the endless belt and while drawing a partial vacuum below the upper surface of the belt to draw the label into firm engagement with the belt, holding the label at the labeling station upon its reaching the same by terminating rotation of the endless belt and by maintaining the partial vacuum below the upper surface of the belt, positioning the article of merchandise transversely across and upon the medial portion of the label while the label is being held at the labeling station, and then lifting and folding the ends of the label about the article of merchandise while maintaining the article in a relatively fixed position at the labeling station such that the label substantially encircles and is adhered to the article.

6. The method as defined in claim 5 wherein the step of separating the label from the carrier web includes drawing the web around a corner member to cause the label to be peeled from the carrrier web.

7. The method as defined in claim 5 comprising the further subsequent steps of removing the article and encircling label from the labeling station, and then repeating the above steps to thereby cyclically deliver labels to the labeling station and apply each of the same to an article of merchandise.

* * * * *